W. E. SHERWOOD.
VEHICLE WHEEL.
APPLICATION FILED MAY 6, 1919.
1,330,096.
Patented Feb. 10, 1920.
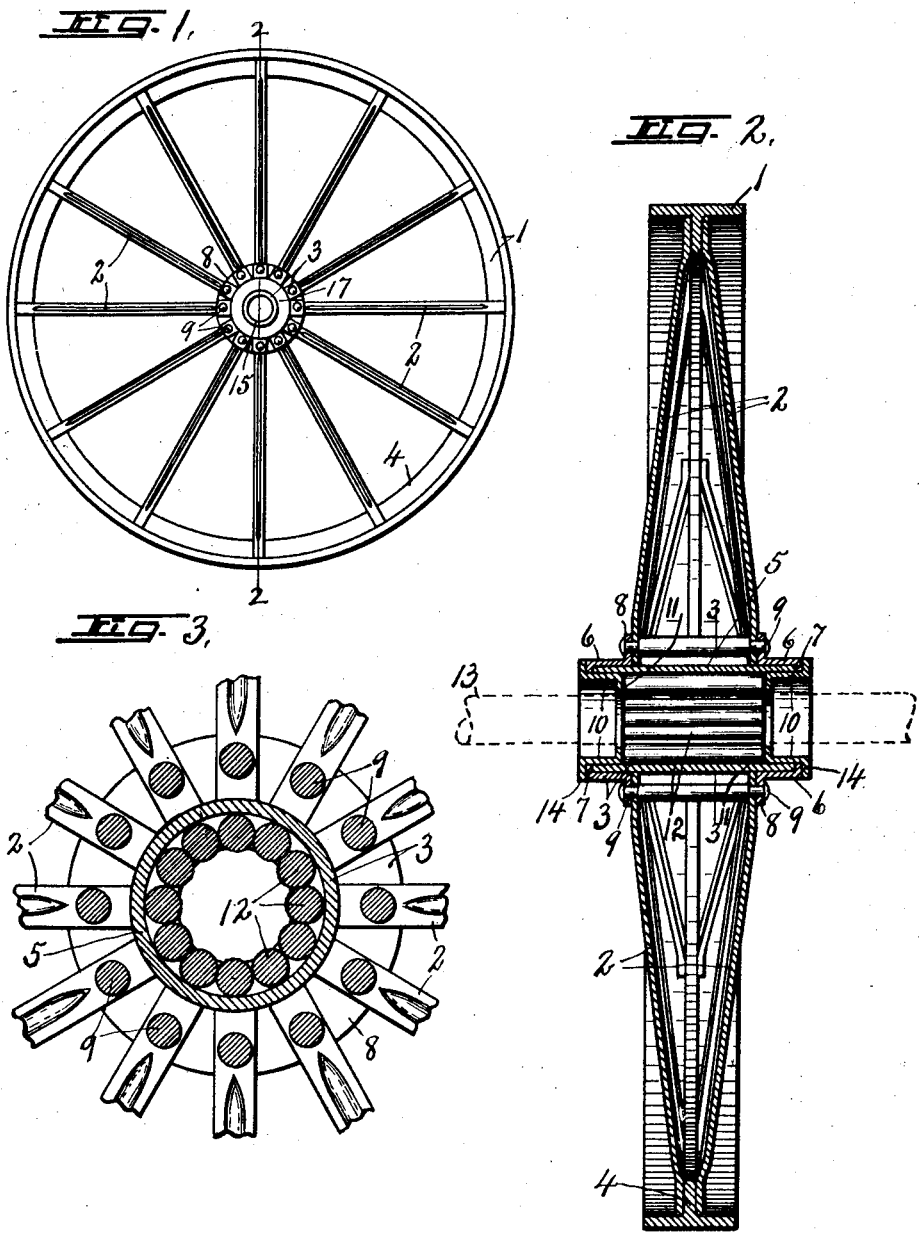

UNITED STATES PATENT OFFICE.

WILLIAM E. SHERWOOD, OF CANASTOTA, NEW YORK, ASSIGNOR TO WATSON PRODUCTS CORPORATION, OF CANASTOTA, NEW YORK, A CORPORATION OF NEW YORK.

VEHICLE-WHEEL.

1,330,096.  Specification of Letters Patent.  Patented Feb. 10, 1920.

Application filed May 6, 1919. Serial No. 295,143.

*To all whom it may concern:*

Be it known that I, WILLIAM E. SHERWOOD, a citizen of the United States of America, and resident of Canastota, in the county of Madison, in the State of New York, have invented new and useful Improvements in Vehicle-Wheels, of which the following, taken in connection with the accompanying drawings, is a full, clear, and exact description.

This invention relates to certain improvements in vehicle wheels of the class set forth in my pending application, Serial No. 282,858 filed March 15th, 1919, except that provision is made for more effectively excluding dust and other foreign matter from the roller bearings.

The main object, in addition to the provision of means for excluding dust and other foreign matter, is to produce a relatively light sheet metal wheel of great strength and durability capable of being used on wheelbarrows and analogous vehicles adapted to carry heavy loads and to be subjected to severe and careless usage.

Other objects and uses relating to specific parts of the wheel will be brought out in the following description.

In the drawings,—

Figure 1 is an end view of a wheel embodying the various features of my invention.

Fig. 2 is an enlarged sectional view through the diameter thereof taken on line 2—2 Fig. 1.

Fig. 3 is a further enlarged transverse sectional view through the hub of the wheel taken in the plane of line 3—3 Fig. 2.

As illustrated, this wheel comprises a rim —1— and sheet metal spokes —2— for connecting the rim to a suitable hub —3— hereinafter more fully described.

The rim —1— is preferably made of T iron bent into the form of a circle and its ends welded together to form a rigid joint, the web or flange as —4— being disposed centrally and internally of the rim and extending throughout its length.

The hub —3— comprises a tubular section —5— and opposite end sections —6— tightly fitted over and upon the opposite ends of the tubular section —5— and having their outer ends provided with internal flanges —7— abutting against the end faces of said tubular section, the inner ends of the sections —6— terminating equal distances from the ends of the tubular section —5— in spaced relation and having outturned flanges —8— similar to those set forth in my pending application referred to for receiving the adjacent ends of the spokes.

These spokes are preferably made of sheet metal, the main bodies thereof being concavo-convex in cross-section with their concave sides innermost while the inner ends abut against the periphery of the tubular hub section —5— and against the inner faces of the flanges —8— to which they are rigidly secured by stay bolts —9—, the outer ends of said spokes abutting against the inner face of the rim —1— and opposite faces of the flange —4— to which they are secured by spot welding or equivalent fastening means thereby firmly uniting the spokes to the rims and hub.

A pair of hollow sheet metal bushings —10— are inserted and tightly fitted within the opposite ends of the tubular hub section —5— and also within the adjacent outer ends of the end sections or sleeves —6—, the inner ends of the bushings —10— being provided with inturned flanges —11— to form retaining abutments for a circumferential series of rollers —12— but more particularly to exclude dust and other foreign matter from the roller bearings.

The outer ends of the bushings —10— are provided with outturned flanges —14— abutting against the adjacent outer faces of the sleeves —6—.

This telescopic assembling of the sleeves —6— upon the opposite ends of the tubular hub section —5— and similar telescopic arrangement of the bushings —10— within the opposite ends of said tubular section —5— and against the end faces of the adjacent bushings reduces to a minimum the liability of dirt and other foreign matter entering the interior of the hub section —5— where the roller bearings —12— are assembled.

That is, the bushing sections —10— constitute cup-shaped fenders having their open end extended some distance beyond the outer ends of the rollers to shield the bearings from rain, snow and dirt while the inturned flanges —11— serve as baffles to deflect outwardly any foreign matter which may tend to lodge within said bushings, the expulsion of said foreign matter through the outer open ends of the bushings being accelerated by the rotation of the hub.

What I claim is:

In a vehicle wheel of the character described, a hub comprising a tubular section, sleeves tightly fitted over and upon the ends of said section and having their inner ends provided with outturned flanges, and tubular bushings tightly fitted within the opposite ends of said section and having their outer ends provided with outturned flanges abutting against the outer ends of the sleeves, said bushings having their inner ends provided with inturned flanges, in combination with roller bearings arranged circumferentially around and within the tubular section and having their ends abutting against the inner flanges of the bushings, spokes secured to the outturned flanges of the sleeves and abutting against the periphery of the tubular hub section, and a rim secured to the outer ends of the spokes.

In witness whereof I have hereunto set my hand this 21st day of April, 1919.

WILLIAM E. SHERWOOD.

Witnesses:
E. C. BROWN,
MAUDE E. HAGUE.